United States Patent
Hanselmann et al.

(10) Patent No.: US 8,337,796 B2
(45) Date of Patent: Dec. 25, 2012

(54) PROCESS FOR REMOVING HYDROGEN CYANIDE FROM ETHANEDINITRILE

(75) Inventors: Paul Hanselmann, Brig-Glis (CH); Ellen Klegraf, Brig-Glis (CH); Wolfgang Wenger, Visp (CH)

(73) Assignee: Lonza AG, Basel (CH)

( * ) Notice: Subject to any disclaimer, the term of this patent is extended or adjusted under 35 U.S.C. 154(b) by 125 days.

(21) Appl. No.: 13/061,813

(22) PCT Filed: Sep. 15, 2009

(86) PCT No.: PCT/EP2009/006658
§ 371 (c)(1),
(2), (4) Date: Mar. 2, 2011

(87) PCT Pub. No.: WO2010/046004
PCT Pub. Date: Apr. 29, 2010

(65) Prior Publication Data
US 2011/0195012 A1    Aug. 11, 2011

Related U.S. Application Data

(60) Provisional application No. 61/114,217, filed on Nov. 13, 2008.

(30) Foreign Application Priority Data

Oct. 22, 2008   (EP) .................................. 08018429

(51) Int. Cl.
*C01C 3/04*   (2006.01)

(52) U.S. Cl. ........................................ 423/384
(58) Field of Classification Search .................. 423/384
See application file for complete search history.

(56) References Cited

U.S. PATENT DOCUMENTS

| | | |
|---|---|---|
| 2,712,493 A | 7/1955 | Moje |
| 3,031,265 A | 4/1962 | Zima |
| 3,135,582 A | 6/1964 | Geerts et al. |
| 3,494,734 A | 2/1970 | Nakamura |
| 3,544,268 A * | 12/1970 | Wayne .......................... 423/372 |
| 3,769,388 A | 10/1973 | Olivier |
| 3,949,061 A | 4/1976 | Yamashita et al. |
| 3,997,653 A | 12/1976 | Riemenschneider et al. |
| 4,073,862 A | 2/1978 | Haese |
| 6,001,383 A | 12/1999 | O'Brien et al. |

FOREIGN PATENT DOCUMENTS

| | | |
|---|---|---|
| DE | 1163302 | 2/1964 |
| DE | 2012509 | 9/1971 |
| DE | 2022455 | 11/1971 |
| DE | 2022454 | 12/1971 |
| DE | 2118819 | 12/1972 |
| WO | 2005037332 A1 | 4/2005 |

OTHER PUBLICATIONS

Riemenschneider et al., "Cyanogen or Oxaminde from HCN in One Step", Chemtech, pp. 658-661; 1976.
Roesky et al., "Dicyan—Eigenschaften and Reaktionen", Chemiker-Zeitung, vol. 108, pp. 231-238; 1984.

* cited by examiner

*Primary Examiner* — Joseph Kosack
(74) *Attorney, Agent, or Firm* — Hoffman & Baron, LLP

(57) ABSTRACT

Process for removing hydrogen cyanide from ethanedinitrile by contacting hydrogen cyanide-containing ethanedinitrile with an organic reagent under formation of a covalent bond.

15 Claims, No Drawings

PROCESS FOR REMOVING HYDROGEN CYANIDE FROM ETHANEDINITRILE

This application is the U.S. National Phase of, and Applicants claim priority from, International Patent Application Number PCT/EP2009/006658 filed 15 Sep. 2009, European Patent Application bearing Serial Number 08018429.4 filed 22 Oct. 2008 and U.S. Provisional Patent Application No. 61/114,217 filed 13 Nov. 2008, which are incorporated herein by reference in their entirety.

BACKGROUND OF THE INVENTION

The present invention relates to a process for removing hydrogen cyanide from ethanedinitrile.

Ethanedinitrile, also known as dicyan, is a colourless and toxic gas which has a sweet pungent odour and a boiling point of −21° C. In chemical terms, its behaviour is similar to that of a halogen and it is therefore referred to as pseudohalogen. Ethanedinitrile is an important intermediate in the preparation of many commercial end products, for instance of synthetic fertilizers and nitriles. In addition, ethanedinitrile finds use in welding technology, since it burns with oxygen in the hottest known flame (4640 K). Further fields of use of ethanedinitrile are its use as a high-performance fuel, as a stabilizer in the preparation of nitrocellulose, or as a fumigant, especially in agriculture, for instance for killing parasites on agricultural soils or in the storage of goods (WO 2005/037332, U.S. Pat. No. 6,001,383).

Ethanedinitrile can be prepared in the laboratory by heating mercury(II) cyanide. In industry, it is usually obtained by oxidizing hydrogen cyanide, typically using chlorine over an activated silicon dioxide catalyst or nitrogen dioxide over copper salts. Alternatively, ethanedinitrile can be produced by catalytic oxidation of hydrogen cyanide with hydrogen peroxide in the presence of copper(II) and iron(II) salts, as described, for example, in DE 2 012 509, DE 2 022 454, DE 2 022 455 and DE 2 118 819.

Ethanedinitrile which has been obtained, for example, by one of the above methods by oxidizing hydrogen cyanide generally comprises unconverted hydrogen cyanide, and also by-products such as oxygen, carbon dioxide or water. The purification of ethanedinitrile, especially the selective and quantitative removal of hydrogen cyanide, is extremely demanding owing to the very similar chemical behaviour of ethanedinitrile and hydrogen cyanide.

U.S. Pat. No. 3,135,582 discloses a process for preparing ethanedinitrile by catalytic oxidation of hydrogen cyanide by means of oxygen and nitrogen oxides. This reaction forms, as a crude product, a mixture of ethanedinitrile, water, nitrogen monoxide, nitrogen dioxide, oxygen and hydrogen cyanide. Since some of these constituents have very similar melting and boiling points, it is difficult to obtain pure ethanedinitrile by simple condensation or distillation. The gaseous product mixture is therefore first contacted with an extraction solvent in which nitrogen dioxide and hydrogen cyanide are soluble, and nitrogen monoxide, oxygen and ethanedinitrile are simultaneously essentially insoluble. Ethanedinitrile is then obtained from the resulting gas mixture by condensation.

The yield of pure ethanedinitrile is relatively low in the process described in U.S. Pat. No. 3,135,582. Moreover, the complexity of an environmentally benign disposal of the hydrogen cyanide-containing extraction solvent is very high, especially since relatively large amounts of extraction solvent have to be used in order to guarantee complete removal of the hydrogen cyanide from the ethanedinitrile.

U.S. Pat. No. 4,073,862 discloses a process for removing ammonia, hydrogen sulphide and hydrogen cyanide from gases. In this process, the gas is first washed with a basic solution in order to remove hydrogen sulphide and hydrogen cyanide. The hydrogen sulphide is subsequently oxidized to elemental sulphur and removed, while the cyanide-containing basic solution has to be disposed of. Under these basic conditions, a hydrolysis of ethanedinitrile would, however, be unavoidable, and so the process described is unsuitable for the purification of ethanedinitrile.

It is therefore an object of the present invention to provide an environmentally benign and inexpensive process for removing hydrogen cyanide from ethanedinitrile, in which the yield of pure ethanedinitrile is at a maximum.

This object is achieved by the process according to claim 1. Further preferred embodiments are the subject-matter of the dependent claims.

DESCRIPTION OF THE INVENTION

The present invention relates to a process for removing hydrogen cyanide from ethanedinitrile by contacting hydrogen cyanide-containing ethanedinitrile with an organic reagent. The hydrogen cyanide enters into a covalent bond with the organic reagent, i.e. it is not just dissolved in a suitable solvent but bound chemically to the reagent used.

According to the invention, the organic reagent(s) used is/are one or more compounds of the general formula

wherein X is an oxo group or an imino group; $R^1$ is an aryl group, a linear or branched alkyl group having 1 to 3 carbon atoms, hydrogen, a carboxy group, a carboxylate group or a formyl group, and $R^2$ is hydrogen, an aryl group or a linear or branched alkyl group having 1 to 3 carbon atoms, with the proviso that $R^1$ and $R^2$ are not both hydrogen; or $R^1$ together with $R^2$ and the carbon atom between them forms a five- to seven-membered carbocyclic ring which may optionally contain one or more double bonds.

Here and hereinafter, the term "aryl" group means an aromatic or heteroaromatic group, preferably a phenyl group, which is either unsubstituted or substituted by one or more halogen atoms and/or one or more linear or branched alkyl or alkoxy groups having 1 to 3 carbon atoms.

The removal of hydrogen cyanide from ethanedinitrile is based on an addition reaction of the cyanide ion, which originates from the hydrogen cyanide, onto the electrophilic C=X group of the organic reagent. This forms a covalent carbon-carbon bond. In contrast, ethanedinitrile does not react with the above-described organic reagents. For this reason, the removal of hydrogen cyanide by the process according to the invention is very selective, and the yield of pure ethanedinitrile is very high. In addition, the organic reagent can be used in stoichiometric amounts. Thus, no multiple excess is needed, as would be the case in an adsorptive removal by means of a solvent. Since ethanedinitrile does not react with the organic reagents used in accordance with the invention, there is also no product loss, which would occur in the case of a solvent up to the appropriate saturation. Typically, the ethanedinitrile to be purified is gaseous, but it can also be purified cooled in liquid or partially liquid form.

The organic reagents used in accordance with the invention are commercially available and relatively nontoxic. According to the state of matter, they can be used as a liquid, in dissolved form or as a solid. If the organic reagent is used as a liquid or in dissolved form, it is optionally additionally possible to add an organic or inorganic base. Suitable bases are, for example, amines, for instance triethylamine, or else alkali metal cyanides, for instance sodium cyanide. The base protonates the hydrogen cyanide to be removed, and the cyanide ion formed reacts with the compound of the general formula I to form the anionic addition product which in turn then acts as a base. In the case of a reaction with addition of base, the amount of base can be selected as desired, but a catalytic amount is also sufficient.

The reaction with hydrogen cyanide is very rapid and normally virtually complete, so that a simple passaging of the hydrogen cyanide-containing ethanedinitrile through the organic reagent is sufficient. The use of specific gas distribution techniques is unnecessary. This allows the process according to the invention to be performed very rapidly, inexpensively and without any great complexity.

It is a further advantage of the process according to the invention that the extremely toxic hydrogen cyanide is bound by the reaction with the organic reagent in the form of a much less toxic and hazardous product, specifically as the cyanohydrin or as the α-aminonitrile. The hydrogen cyanide is thus not just washed out selectively but also converted simultaneously to a harmless compound. This considerably eases environmentally benign disposal. The cyanohydrins or aminonitriles formed may, for example, be incinerated or converted in an alkaline hydrolysis, for example under elevated pressure and/or at elevated temperature, to sodium formate and ammonia. Alternatively, the cyanohydrins can also be cleaved to cyanide and carbonyl compound in reversal of their formation reaction, for example by addition of bases. Subsequent acidification allows the hydrogen cyanide and/or the carbonyl compound to be recovered if desired.

In a preferred embodiment, the organic reagent used is a carbonyl compound, i.e. a compound of the general formula I in which X is an oxo group.

Particularly preferred as the organic reagent are carbonyl compounds in which $R^1$ is a carboxy group (for example Ia and Id), a carboxylate group (for example Ib) or a formyl group (for example Ic); and $R^2$ is hydrogen (for example Ia-c) or a methyl group (for example (Id).

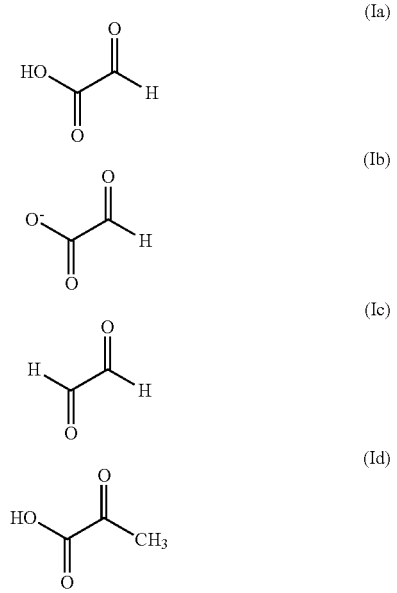

The compounds Ia to Id are particularly reactive towards cyanide ions, and so the addition reaction proceeds very rapidly and quantitatively. Moreover, these organic reagents are very easy to prepare, or inexpensive to purchase. Since the compounds Ia to Id are nonvolatile in spite of their low molecular weight, neither during transport and storage nor during performing the process according to the invention particular cooling measures are necessary. Nor are any contaminations of the product to be expected either. In addition, these compounds are relatively nontoxic and can be disposed of in an environmentally benign manner with a low level of complexity.

Also particularly preferred are cyclohexanone as the organic reagent. A base can additionally be added. Suitable bases are, for example, amines, for instance triethylamine; or alkali metal cyanides, for instance sodium cyanide. Since cyclohexanone is liquid at room temperature, it can be used readily in undiluted form. Cyclohexanone is particularly reactive towards cyanide ions, and so the addition reaction proceeds very rapidly and quantitatively with and without addition of base. Moreover, it is nontoxic, relatively cheap, and transport, storage and disposal are very unproblematic. Since cyclohexanone has a relatively high boiling point and a low vapour pressure, no contamination of the ethanedinitrile by cyclohexanone occurs.

In a most preferred embodiment, the organic reagent used is glyoxylic acid Ia or a salt of glyoxylic acid Ib or a mixture of Ia and Ib. Preferred salts of glyoxylic acid are alkali metal or alkaline earth metal glyoxylates; very preferred is sodium glyoxylate or potassium glyoxylate.

These organic reagents are preferably used in aqueous solution, in which case a base, preferably sodium hydroxide, can additionally be added. The addition of hydrogen cyanide onto glyoxylic acid and glyoxylate is very rapid and is quantitative, especially for glyoxylate. Both glyoxylic acid and the addition product are readily water-soluble, and so no precipitate forms in the reaction vessel, which ensures a reliable process. Since glyoxylic acid has a relatively high melting point (semihydrate: 70-75° C.; anhydrous substance: 98° C.) and is water-soluble, the process according to the invention can be carried out within a relatively wide temperature range, without any risk of contamination of the product gas by the organic reagent. Cooling or heating, in contrast to the known processes with volatile organic solvents, is not required. Moreover, it is not necessary during the reaction to control the pH of the reagent which reacts with hydrogen cyanide, and so the process according to the invention can be performed without any great pH regulation complexity. When glyoxylic acid is used in the process according to the invention to remove hydrogen cyanide from ethanedinitrile, the yields of pure ethanedinitrile are particularly high.

In a further most preferred embodiment, the organic reagent used is glyoxal Ic. Glyoxal is commercially available, cheap and, as a very good electrophile, constitutes a suitable substrate for addition of cyanide ions. The reaction proceeds rapidly and with a high conversion. Since the cyanohydrin is converted fully to sodium formate and ammonia by glyoxal through hydrolysis, this compound is particularly suitable for disposal by means of hydrolysis.

In an also most preferred embodiment, the organic reagent used is pyruvic acid Id. Pyruvic acid can be used either with or without addition of base. Suitable bases are, for example, amines, for instance triethylamine; or alkali metal cyanides. They likewise possess a high reactivity towards cyanide ions, and the addition reaction therefore proceeds rapidly and with high conversion. Pyruvic acid is commercially available, cheap and nontoxic. There are no particular requirements for its storage, transport and disposal needed.

Alternatively to the aforesaid carbonyl compounds, the organic reagent used to chemically bind hydrogen cyanide may also be imines, i.e. compounds of the general formula I, in which X is an imino group. $R^1$ and $R^2$ are more preferably each an aryl group, and most preferred is the use of benzophenone imine (X=NH, $R^1$=$R^2$=phenyl), optionally dissolved in an organic solvent. Benzophenone imine is a liquid with a high boiling point, and it is therefore possible to work within a wide temperature range with no expectation of any contamination of the product. Benzophenone imine is commercially available and nontoxic. There are no particular requirements for its storage, transport and disposal needed.

In a preferred embodiment, the organic reagent of the formula I is used in the form of an aqueous solution. This is advantageous especially in the case of organic reagents having a melting point higher than the temperature at which the process according to the invention is carried out. The use of an aqueous solution allows of the contact between hydrogen cyanide and organic reagent to be optimized, thus guaranteeing the quantitative removal of the hydrogen cyanide from the ethanedinitrile. In addition, the use of water allows of inexpensive and environmentally friendly disposal.

In a further preferred embodiment, the organic reagent of the formula I is used in the form of a solution in an organic solvent, especially in an organic solvent with a high boiling point and a high vapour pressure. The organic solvent used may, for example, be benzene, toluene, ethylbenzene, xylene, mesitylene, isopropyltoluene, heptane, decalin, benzonitrile, chlorobenzene, dichlorobenzene, dimethyl sulphoxide, butyronitrile, isobutyronitrile, dichloroethane, dioxane, cumene, methylcyclohexane, propanenitrile, dibutyl ether, di-tert-butyl ether, diisopropyl ether or high-boiling petroleum ether. Benzene, toluene, xylene and high-boiling petroleum ether are particularly suitable. The use of an organic solvent is advantageous especially in the case of organic reagents whose melting point is higher than the temperature at which the process according to the invention is carried out. The use of a solution allows the contact between hydrogen cyanide and organic reagent to be optimized, thus guaranteeing the quantitative removal of the hydrogen cyanide from the ethanedinitrile.

The present invention further also relates to the use of glyoxylic acid, a salt of glyoxylic acid or a mixture thereof for removing hydrogen cyanide from ethanedinitrile. As described above, glyoxylic acid or an alkali metal or alkaline earth metal salt of glyoxylic acid, preferably potassium glyoxylate or sodium glyoxylate, are particularly suitable, since the addition of hydrogen cyanide is very rapid and quantitative. Both glyoxylic acid and/or glyoxylate and the addition product have good water solubility, and thus the reaction does not form any precipitate. Since glyoxylic acid has a relatively high melting point (semihydrate: 70-75° C.; anhydrous substance: 98° C.), the process according to the invention can be performed within a relatively wide temperature range without any risk of contamination of the product gas by the organic reagent. Moreover, it is not necessary during the reaction to control the pH of the reagent reacting with hydrogen cyanide, so that the process according to the invention can be performed without any great pH regulation complexity. When glyoxylic acid and/or glyoxylate are/is used in the process according to the invention, the yields of ethanedinitrile are particularly high.

In a preferred embodiment, the hydrogen cyanide-freed ethanedinitrile as obtained by the process according to the invention is dried and/or condensed or desublimed.

For the drying, i.e. for the removal of water, the hydrogen cyanide-freed ethanedinitrile is preferably contacted with a sorbent. Suitable sorbents are, for example, silica gel, sodium sulphate, magnesium sulphate, calcium chloride, calcium sulphate, calcium oxide, soda lime, barium oxide, potassium carbonate, phosphorus pentoxide or molecular sieves. Alternatively, the ethanedinitrile can also be freed from water by freezing it out.

The condensation or desublimation of the ethanedinitrile serves especially to remove carbon dioxide. For this purpose, the ethanedinitrile which has been freed of hydrogen cyanide and if necessary dried is cooled to a temperature at which ethanedinitrile liquefies or solidifies, but carbon dioxide does not. Simple separation of the phases then allows the carbon dioxide to be separated from the ethanedinitrile. The condensation or the freezing is preferably carried out at standard pressure or at elevated pressure, for example between about 1 to 15 bar, and at a temperature of from −78° C. to 30° C., especially at a temperature of from −78° C. to 20° C.

In the process according to the invention, cyanohydrin or aminonitril is formed depending on the nature of the substituent X, i.e. cyanohydrin if X is an oxo group or aminonitril if X is an imino group.

In a preferred embodiment, the formed and removed cyanohydrin or aminonitrile is converted into a formate salt and ammonia in a subsequent alkaline hydrolysis. Preferably, the alkaline hydrolysis is carried out with sodium hydroxide, which then forms the sodium salt of formate.

In an also preferred embodiment, the formed cyanohydrin is reformed into the carbonyl compound and into hydrogen cyanide and/or cyanide in a subsequent step.

EXAMPLES

Example 1

Preparation of Ethanedinitrile and Purification with Sodium Glyoxylate

In a 2 L stirred apparatus (Labmax) with temperature-controlled jacket, stirrer, reflux condenser, pH meter and two dosing systems, 25.3 g of iron(III) sulphate hydrate and 24.7 g of copper(II) sulphate pentahydrate were dissolved in 308 mL of water. Within 120 min, 100 g of hydrogen cyanide (100%) and 209 g of hydrogen peroxide (30%) were added dropwise in parallel at a temperature of 20° C.

The gas formed during the reaction had the following composition (by gas-chromato-graphic analysis):
ethanedinitrile: 90.0%
hydrogen cyanide: 1.00%
water: 0.60%
carbon dioxide: 8.40%

The gas mixture was passed through a gas washer containing 10% aqueous sodium glyoxylate solution which had been prepared from aqueous sodium hydroxide solution and aqueous glyoxylic acid solution, and then, for drying, through a gas washing bottle equipped with molecular sieve (3 Å). After these washing and drying steps, the ethanedinitrile gas had the following composition (by gas-chromatographic analysis):
ethanedinitrile: 90.0%
hydrogen cyanide: —
water: —
carbon dioxide: 10.0%

The ethanedinitrile thus obtained was selectively frozen out in a cold trap at −78° C. The escape of the gaseous carbon dioxide was monitored in a downstream absorber containing 20% aqueous potassium hydroxide solution.

The yield of pure ethanedinitrile was 71 g (66%).

Example 2

Preparation of Ethanedinitrile and Purification with Glyoxylic Acid

In a 2 L stirred apparatus (Labmax) with temperature-controlled jacket, stirrer, reflux condenser, pH meter and two dosing systems, 7.5 g of iron(III) sulphate hydrate and 7.5 g of copper(II) sulphate pentahydrate were dissolved in 308 mL of water. Within 120 min, 136 g of hydrogen cyanide (100%)

and 288 g of hydrogen peroxide (30%) were added dropwise in parallel at a temperature of 20° C.

The gas formed during the reaction had the following composition (by gas-chromato-graphic analysis):
ethanedinitrile: 90.40%
hydrogen cyanide: 4.40%
water: 0.58%
carbon dioxide: 4.60%

The gas mixture was passed through a gas washer containing 10% aqueous glyoxylic acid solution, and then, for drying, through a gas washing bottle equipped with molecular sieve. After these washing and drying steps, the ethanedinitrile gas had the following composition (by gas-chromatographic analysis):
ethanedinitrile: 93.20%
hydrogen cyanide: 0.80%
water: —
carbon dioxide: 6.00%

The ethanedinitrile thus obtained was selectively frozen out in a cold trap at −78° C. The escape of the gaseous carbon dioxide was monitored in a downstream absorber containing 20% aqueous potassium hydroxide solution.

The yield of pure ethanedinitrile was 103 g (76%).

Example 3

Preparation of Ethanedinitrile and Purification with Cyclohexanone

In a 2 L stirred apparatus (Labmax) with temperature-controlled jacket, stirrer, reflux condenser, pH meter and two dosing systems, 25.3 g of iron(III) sulphate hydrate and 24.7 g of copper(II) sulphate pentahydrate were dissolved in 308 mL of water. Within 120 min, 100 g of hydrogen cyanide (100%) and 251 g of hydrogen peroxide (30%) were added dropwise in parallel at a temperature of 15° C.

The gas mixture formed in the reaction was passed through a gas washer which contained 38.3 mL of cyclohexanone and 0.5 g of sodium cyanide, and then through a reflux condenser cooled to −10° C. After these washing and drying steps, the ethanedinitrile was obtained in 60% yield and with the following composition (by gas-chromatographic analysis):
ethanedinitrile: 79.71%
hydrogen cyanide: 0.68%
water: —
carbon dioxide: 19.58%

Example 4

Preparation of Ethanedinitrile and Purification with Cyclohexanone

In a 2 L stirred apparatus (Labmax) with temperature-controlled jacket, stirrer, reflux condenser, pH meter and two dosing systems, 25.3 g of iron(III) sulphate hydrate and 24.7 g of copper(II) sulphate pentahydrate were dissolved in 308 mL of water. Within 120 min, 100 g of hydrogen cyanide (100%) and 251 g of hydrogen peroxide (30%) were added dropwise in parallel at a temperature of 15° C.

The gas mixture formed in the reaction was passed through a gas washer which contained 38.3 mL of cyclohexanone and 1.1 g of triethylamine, and then through a reflux condenser cooled to −10° C. After these washing and drying steps, the ethanedinitrile was obtained in 66% yield and with the following composition (by gas-chromatographic analysis):
ethanedinitrile: 83.84%
hydrogen cyanide: 0.06%
water: —
carbon dioxide: 16.10%

Example 5

Preparation of Ethanedinitrile and Purification with Glyoxal

In a 2 L stirred apparatus (Labmax) with temperature-controlled jacket, stirrer, reflux condenser, pH meter and two dosing systems, 2.5 g of iron(III) sulphate hydrate and 2.5 g of copper(II) sulphate pentahydrate were dissolved in 308 mL of water. Within 90 min, 100 g of hydrogen cyanide (100%) and 126.4 g of hydrogen peroxide (50%) were added dropwise in parallel at a temperature of 20° C.

The gas formed during the reaction had the following composition (by gas-chromato-graphic analysis):
ethanedinitrile: 89.00%
hydrogen cyanide: 3.50%
water: 0.60%
carbon dioxide: 6.80%

The gas mixture was passed through a gas washer containing aqueous 40% glyoxal solution and then, for drying, through a drying tower equipped with molecular sieve. After these washing and drying steps, the ethanedinitrile was obtained in 66% yield and with the following composition (by gas-chromatographic analysis):
ethanedinitrile: 95.00%
hydrogen cyanide: 0.70%
water: —
carbon dioxide: 4.30%

Example 6

Preparation of Ethanedinitrile and Purification with Pyruvic Acid

In a 2 L stirred apparatus (Labmax) with temperature-controlled jacket, stirrer, reflux condenser, pH meter and two dosing systems, 2.5 g of iron(III) sulphate hydrate and 2.5 g of copper(II) sulphate pentahydrate were dissolved in 308 mL of water. Within 150 min, 100 g of hydrogen cyanide (100%) and 126 g of hydrogen peroxide (50%) were added dropwise in parallel at a temperature of 20° C.

The gas formed during the reaction had the following composition (by gas-chromato-graphic analysis):
ethanedinitrile: 92.00%
hydrogen cyanide: 1.70%
water: 1.00%
carbon dioxide: 5.30%

The gas mixture was passed through a gas washer containing pyruvic acid and then, for drying, through a drying tower equipped with molecular sieve. After these washing and drying steps, the ethanedinitrile was obtained in 71% yield and with the following composition (by gas-chromatographic analysis):
ethanedinitrile: 97.50%
hydrogen cyanide: 0.30%
water: —
carbon dioxide: 2.20%

Example 7

Preparation of Ethanedinitrile and Purification with Pyruvic Acid

In a 2 L stirred apparatus (Labmax) with temperature-controlled jacket, stirrer, reflux condenser, pH meter and two dosing systems, 2.5 g of iron(III) sulphate hydrate and 2.5 g of copper(II) sulphate pentahydrate were dissolved in 308 mL of water. Within 120 min, 100 g of hydrogen cyanide (100%) and 126 g of hydrogen peroxide (50%) were added dropwise in parallel at a temperature of 20° C.

The gas formed during the reaction had the following composition (by gas-chromato-graphic analysis):
ethanedinitrile: 85.00%
hydrogen cyanide: 2.20%
water: 0.80%
carbon dioxide: 12.00%

The gas mixture was passed through a gas washer containing 250 g of pyruvic acid and 20 g of triethylamine and then, for drying, through a drying tower equipped with molecular sieve. After these washing and drying steps, the ethanedinitrile was obtained in 54% yield and with the following composition (by gas-chromatographic analysis):
ethanedinitrile: 94.40%
hydrogen cyanide: 0.30%
water: —
carbon dioxide: 5.20%

Example 8

Preparation of Ethanedinitrile and Purification with Benzophenone Imine

In a 2 L stirred apparatus (Labmax) with temperature-controlled jacket, stirrer, reflux condenser, pH meter and two dosing systems, 2.5 g of iron(III) sulphate hydrate and 2.5 g of copper(II) sulphate pentahydrate were dissolved in 308 mL of water. Within 150 min, 100 g of hydrogen cyanide (100%) and 126 g of hydrogen peroxide (50%) were added dropwise in parallel at a temperature of 20° C.

The gas formed during the reaction had the following composition (by gas-chromatographic analysis):
ethanedinitrile: 95.30%
hydrogen cyanide: 1.70%
water: 0.55%
carbon dioxide: 2.45%

The gas mixture was passed through a gas washer containing 25 g of benzophenone imine and 260 mL of petroleum ether and then, for drying, through a drying tower equipped with molecular sieve. After these washing and drying steps, the ethanedinitrile was obtained with traces of petroleum ether and had the following composition (by gas-chromatographic analysis):
ethanedinitrile: 96.50%
hydrogen cyanide: 1.30%
water: —
carbon dioxide: 2.20%

The invention claimed is:

1. A process for removing hydrogen cyanide from ethanedinitrile by contacting hydrogen cyanide-containing ethanedinitrile with an organic reagent, characterized in that hydrogen cyanide enters into a covalent bond with the organic reagent, and that the organic reagent comprises one or more compounds of the general formula

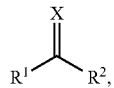

(I)

wherein
X is an oxo group or an imino group;
$R^1$ is an aryl group, a linear or branched alkyl group having 1 to 3 carbon atoms, hydrogen, a carboxy group, a carboxylate group or a formyl group, and
$R^2$ is hydrogen, an aryl group or a linear or branched alkyl group having 1 to 3 carbon atoms, with the proviso that $R^1$ and $R^2$ are not both hydrogen; or
$R^1$ together with $R^2$ and the carbon atom between them form a five- to seven- membered carbocyclic ring which may optionally contain one or more double bonds.

2. The process according to claim 1, characterized in that X is an oxo group.

3. The process according to claim 2, characterized in that $R^1$ is a carboxy group, a carboxylate group or a formyl group, and $R^2$ is hydrogen or a methyl group.

4. The process according to claim 2, characterized in that the organic reagent is cyclohexanone.

5. The process according to claim 2, characterized in that the organic reagent is glyoxylic acid, a salt of glyoxylic acid or a mixture of these aforesaid reagents.

6. The process according to claim 2, characterized in that the organic reagent is glyoxal.

7. The process according to claim 2, characterized in that the organic reagent is pyruvic acid.

8. The process according to claim 1, characterized in that X is an imino group.

9. The process according to claim 8, characterized in that $R^1$ and $R^2$ each are an aryl group.

10. The process according to claim 1, characterized in that the organic reagent is used in the form of an aqueous solution, optionally with addition of base.

11. The process according to claim 1, characterized in that the organic reagent is used in the form of a solution in an organic solvent, optionally with addition of base.

12. The process according to claim 1, characterized in that the hydrogen cyanide-freed ethanedinitrile is dried and/or condensed or desublimed.

13. The process according to claim 1, characterized in that the formed cyanohydrin or aminonitrile is converted into a formate salt and ammonia in a subsequent alkaline hydrolysis.

14. The process according to claim 1, characterized in that the formed cyanohydrin is reformed into the carbonyl compound and into hydrogen cyanide and/or cyanide in a subsequent step.

15. The process according to claim 10, characterized in that the formed cyanohydrin is reformed into the carbonyl compound and into hydrogen cyanide and/or cyanide in a subsequent step.

* * * * *